April 11, 1967     F. K. KNOHL     3,313,197

SCREW

Filed Sept. 8, 1965

INVENTOR.
Friedrich Karl Knohl

BY

*Robert W. Beart*

His Att'ys

United States Patent Office 3,313,197
Patented Apr. 11, 1967

3,313,197
SCREW
Friedrich Karl Knohl, Roselle, Ill., assignor to Illinois Tool Works Inc., Chicago, Ill., a corporation of Delaware
Filed Sept. 8, 1965, Ser. No. 485,782
2 Claims. (Cl. 85—9)

This invention relates to a fastener and more particularly relates to a screw having a construction which makes it especially useful in certain applications. Of particular importance is the head and neck construction which in combination give the screw special utility as a hinge screw and as a fastener for plastic-coated wallboard installations.

In the installation of wallboard, the screws used in the past have been designed to make the heads as inconspicuous as possible. Emphasis has therefore been placed on the use of a flat head screw of any of various forms. In order for such head to become inconspicuous the screw is driven until all of the head depth has penetrated the surface of the wallboard. One such head, for example, is shaped like the bell of a bugle flaring outwardly from the screw shank toward a thin rim to effect a gradually decreasing depression of the wallboard as the surface of the board moves from the shank toward the rim or edge of the screw head. Although such form of a screw head has a thin edge which diminishes the severity of the depression, it may nevertheless affect to some degree a relatively large area of the walboard surrounding the screw. The inherent partial destruction of the surrounding area diminishes the pull-out strength of the resulting fastening. From the foregoing it can accordingly be seen that certain benefits obtained by flat head fasteners are offset by the described detrimental aspects.

Similarly, the past choice of screw head for fastening hinges to door and door jamb has been directed to flat head screws to produce as uniformly smooth a surface as possible. High volume door production and rapid hanging of doors require rapid setting of the screws but without interefence with hinge and door operation and without destructive tension loading of the head if setting of the screw is at an angle other than normal to the hinge plate. In addition, hinges can most quickly be fastened by use of as crew having a cruciform recess permitting faster engagement with power screw driver. However, a flat head screw may have insufficient volume of material in the head indented by a cruciform recess to permit the use of high torque tools.

Accordingly, it is an object of the invention to provide a screw fastener suitable for wallboard installation which will essentially restrict destruction of the wallboard structure to the portion penetrated by the screw shank.

A further object of the invention is to provide a screw that will effectively conceal any surface bulging or tearing that occurs in the cover layer or coating in the area immediately surrounding the area of contact between the screw head and the cover sheet or plastic coating.

A still further object is to provide a screw with shallow head which has sufficient strength to withstand the torque requirements and tension loading of the screw head in high volume hinge mounting techniques.

An additional object of the invention is to provide a screw for hinge fastening in which slanting of the screw will not adversely affect either its utility or hinge function.

These and other related objects have been achieved by this invention which provides a screw with a shallow head—a head diameter at least two and one-half times the diameter of the threaded shank and a total head height of less than two-thirds the diameter of the threaded shank—the head having curvilinear upper surface and a lower portion having an underside normal to the screw shank, the periphery of the lower portion of the head flaring radially outwardly with an included angle of about 80° to 100°, the head of the screw being joined to the shank by means of a tapered neck flaring radially outwardly with an included angle of about 40° to 55°, the neck having a height essentially equal to the total height of the screw head.

Further definition and description can be had by reference to the drawings in which FIG. 1 is an elevational view of a screw incorporating the novel features of the present invention;

FIG. 4 is a fragmentary portion of a door to which a hinge plate is attached in recessed position by means of the screw of the form contemplated by the present invention;

Figure 1:
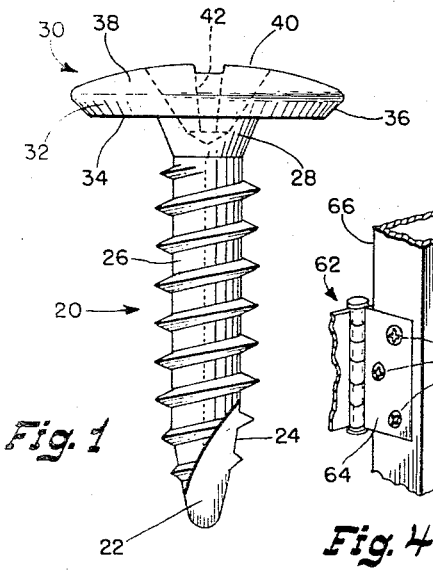

Referring to FIG. 1, screw 20 is provided with tip 22 which is cut away in part according to the known methods to provide the tip with a cutting edge 24 on the entering end of threaded shank 26. On the opposite end of threaded shank 26 is neck 28 flaring radially outwardly with an included angle of from 40° to 55° and a height approximately equal to the total height of head 30 to which it is joined. Head 30 comprises lower portion 32 having an underside 34 in a plane normal to the axis of threaded shank 26 and a periphery 36 flaring radially outwardly with an included angle of about 80° to 100°, the total height of head 30 being less than two-thirds the diameter of the threaded shank. Upper portion 38 is defined by curvilinear surface 40 penetrated by cruciform recess 42 for engagement by suitable driving means. Head 30 has a diameter at least two and one-half times the diameter of the threaded shank 26, two and one-half to three times that diameter being the preferred range.

Figure 2:
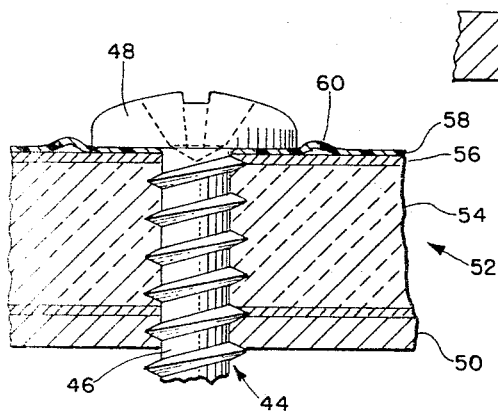
FIG. 2 is an elevational view of the prior art rotary fastener used in attaching coated wallboard in a way analogous to one manner in which the screw of the present invention is used.

A screw 44 of the most analogous prior art form for wallboard installation is shown in FIG. 2. Screw 44 comprises threaded shank 46 and pan head 48 used for mounting on backing 50 the paneling 52 comprising gypsum 54 with paper layer 56 and plastic cover sheet 58 in which bulge 60 is produced by pan head 48.

Figure 3:
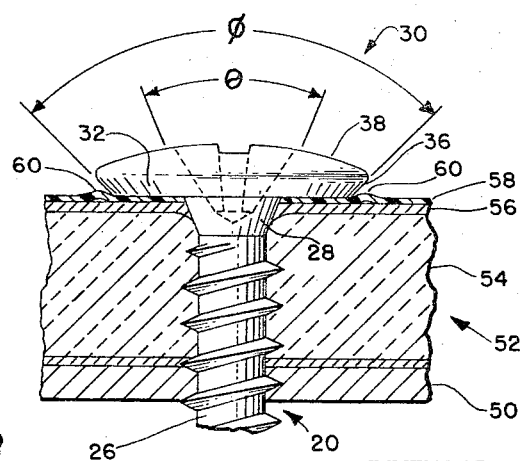
FIG. 3 is an elevational view of the same screw as shown in FIG. 1 used in the same application as the screw of FIG. 2 for mounting wallboard paneling.

In somewhat more detail in FIG. 3, the head of screw 20 shown in FIG. 1 is pictured in the same application of attaching wallboard with threaded shank 26 which penetrates wallboard 52, gypsum 54, paper layer 56 and plastic cover sheet 58 in which bulge 60 is formed. Such gypsum board has a paper wrap and a pre-finished exterior decorative coating of vinyl plastic. Because of its diameter in excess of two and one-half times the diameter of the threaded shank, head 30 provides by means of its flat underside a large bearing area. To maintain a minimum penetration while providing both sufficient juncture strength between the head 30 and the rest of the screw structure neck 28 is provided with an included angle $\theta$ in the range of 40° to 55°. This also provides a means for drawing both paper 56 and plastic cover 58 into the perforation. As a result of the large bearing surface between head 30 and plastic cover sheet 58 and the tendency of neck 28 to draw cover sheet 58 tight and smooth the size and extent of bulge 60 is reduced. Lower portion 34 of shallow head 30 with a periphery 36 defined by an included angle $\phi$ of about 80° to 100° is thereby able to conceal any bulge 60 that may result.

Figure 5:
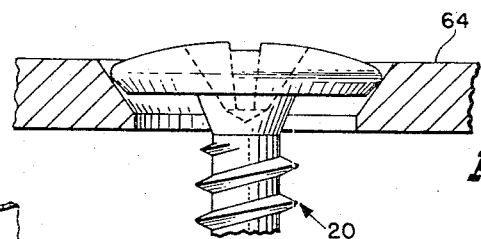
FIG. 5 is an elevational view of the screw shown in FIG. 1 with the axis of the screw positioned in a plane normal to the hinge plate.
Figure 6:
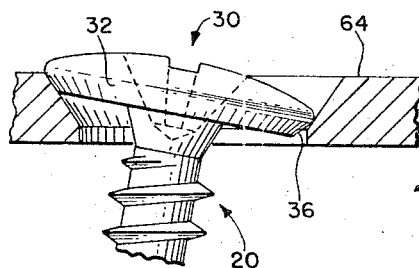
FIGS. 6 and 7 are elevational views of the screw developed according to this invention shown in the same application as that of FIG. 5 with the axis of the screw canted in relation to a plane normal to that of the hinge plate.
Figure 7:
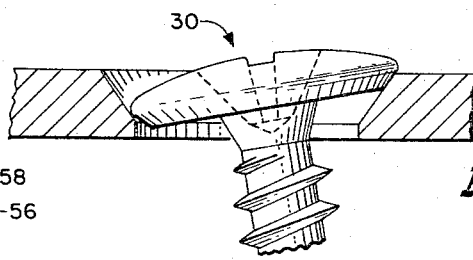

The same screw of this invention previously discussed also has special significance as a hinge screw, such use being represented in FIG. 4 by hinge 62 comprising hinge plate 64 shown in recess in door 66 and held in place by screw heads 30. A standardized practice in the construction industry where countersinking is used is to provide a socket having an included angle of 80°. In FIG. 5 such screw 20 is shown aligned normal to hinge plate 64, particular effort being required to achieve or closely approach this positioning with prior art flat head screws. By means of the screw of this invention providing a periphery on the lower portion of the head with an included angle of 80° to 100°, by making the head diameter in excess of two and one-half times the diameter of the shank and by providing a neck between shank and head with an included angle on the order of 40° to 55° it is possible to employ screw 20 in the manner as pictured in FIGS. 6 and 7 in what would be commonly regarded as undesirable misalignment as related to hinge plate 64. It can be seen in both FIGS. 6 and 7 that screw 30 presents an extent of protrusion above hinge plate 64 which is essentially unchanged from the protrusion produced with the precise alignment shown in FIG. 5.

A screw construction according to the foregoing discussion with a cutting edge at its entering end drills its own hole. This in combination with the essentially unchanged form and extent of protrusion of the upper surface of the head eliminates any need for precise alignment of the screw in a plane perpendicular to the hinge plate. In high-volume production requiring rapid setting of this screw such inexact positioning nevertheless produces no interference with hinge and door operation even with the screw at a substantial angle with a line normal to the plane of the hinge plate. The flaring neck and the curvilinear top surface of the screw give the shallow head sufficient volume to permit extensive indentation for a high-strength recess suitable for high speed, high torque driving equipment used in industrial door production.

As has been further indicated, by means of such a screw a more economical installation of plastic-covered wallboard can be made in paneling of recreation rooms, school buildings, office buildings and other commercial and industrial structures. In such applications a flat underside on the large diameter shallow head uniquely eliminates the breaking of the wallboard. By means of the flaring neck, the plastic cover sheet is drawn tight and, by means of the flaring lower portion of the shallow head, bulging that might occur in the cover sheet is substantially or completely concealed under the flaring periphery of the screw head where it serves to minimize the appearance of a protruding effect otherwise attributable to the screw head.

With the many modifications both mentioned and implicity present, there is no intention to limit the scope of the invention except as indicated in the following claims:

I claim:

1. A fastener comprising a threaded shank having at one end a cutting edge means for drilling an aperture, said shank at its opposite end having a tapered, unthreaded neck flaring radially outwardly from said shank and terminating in a head having a lower portion and an upper portion, said lower portion having a clamping surface normal to said shank and providing a juncture with said tapered neck, said lower portion further having a periphery flaring radially outwardly from said clamping surface at an included angle of from 80° to 100°, said upper portion having a top curvilinear surface, the combined height of said lower and upper portions being less than ⅔ the diameter of said shank and the diameter of said head being at least two and one-half times the diameter of said shank, said tapered neck having an included angle of from 40° to 55° and having a height measured along the axis of said shank substantially equal to the combined axial height of said lower and upper portions of said head, said head being continuous about its periphery and being provided with a recess in said upper portion for engagement with a driving tool.

2. In combination, a headed screw threaded fastener and a workpiece having a countersunk aperture, said workpiece aperture having an included angle between its sidewalls of substantially 80°, said fastener comprising a threaded shank having at one end of said shank a cutting edge means for drilling an aperture, at the opposite end of said shank a tapered unthreaded neck flaring radially outwardly from said shank with an included angle of from 40° to 55° and a head integral with said tapered neck, said head having a lower portion and an upper portion, said lower portion having an underside normal to said shank and providing a juncture with said tapered neck, said lower portion having a periphery flaring radially outwardly from said underside with an included angle of from 80° to 100°, said upper portion providing a curvilinear surface for said head opposite said shank, the combined height of said lower and upper portions being less than two-thirds the diameter of said shank and being less than the thickness of the workpiece with which it is associated and being substantially equal to the axial height of said tapered neck, and the diameter of said head being at least two and one-half times the diameter of said shank and less than the diameter of the base of the cone forming the countersunk aperture in the workpiece, said head being adapted to protrude above said workpiece a predetermined distance when said shank is coaxial with the axis of the countersunk aperture of said workpiece, said fastener being adapted when said threaded shank is canted relative to the axis of said aperture to present a head height protrusion above said workpiece substantially no greater than when said shank is disposed on the axis of said aperture.

References Cited by the Examiner

UNITED STATES PATENTS

| 1,603,195 | 10/1926 | Crain | 85—9 |
| 1,807,494 | 5/1931 | Proctor | 85—9 |
| 2,982,166 | 5/1961 | Hobbs | 85—9 |
| 3,221,588 | 12/1965 | Wieber | 85—47 |

FOREIGN PATENTS 695,138   8/1953   Great Britain.

CARL W. TOMLIN, *Primary Examiner.*

MARION PARSONS, JR., *Examiner.*